No. 758,296. PATENTED APR. 26, 1904.
W. P. BRETT.
WINDMILL.
APPLICATION FILED MAY 23, 1902.
NO MODEL. 2 SHEETS—SHEET 2.
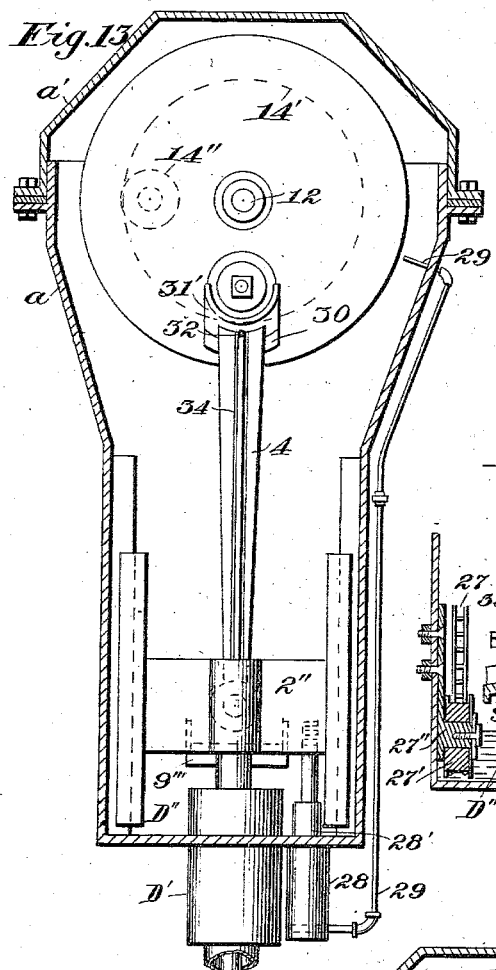
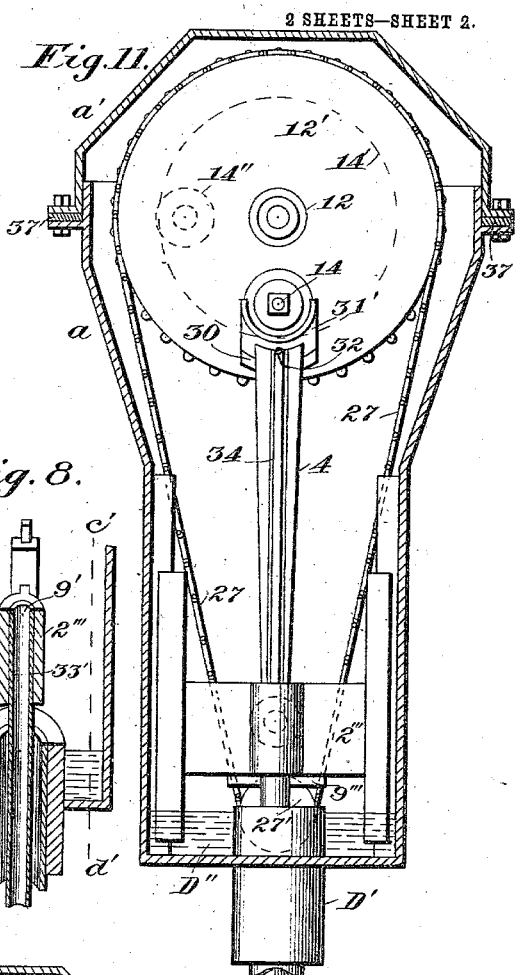
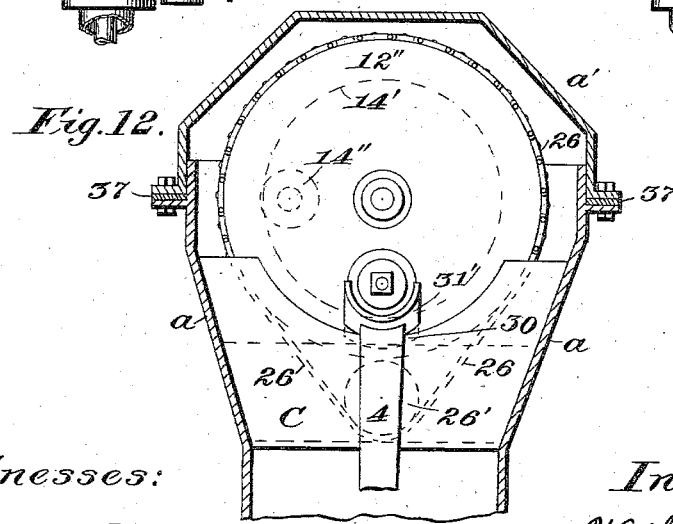
Witnesses:
George W. Fisher
John H. Oren
Inventor:
William P. Brett No. 758,296.                                                                                     Patented April 26, 1904.

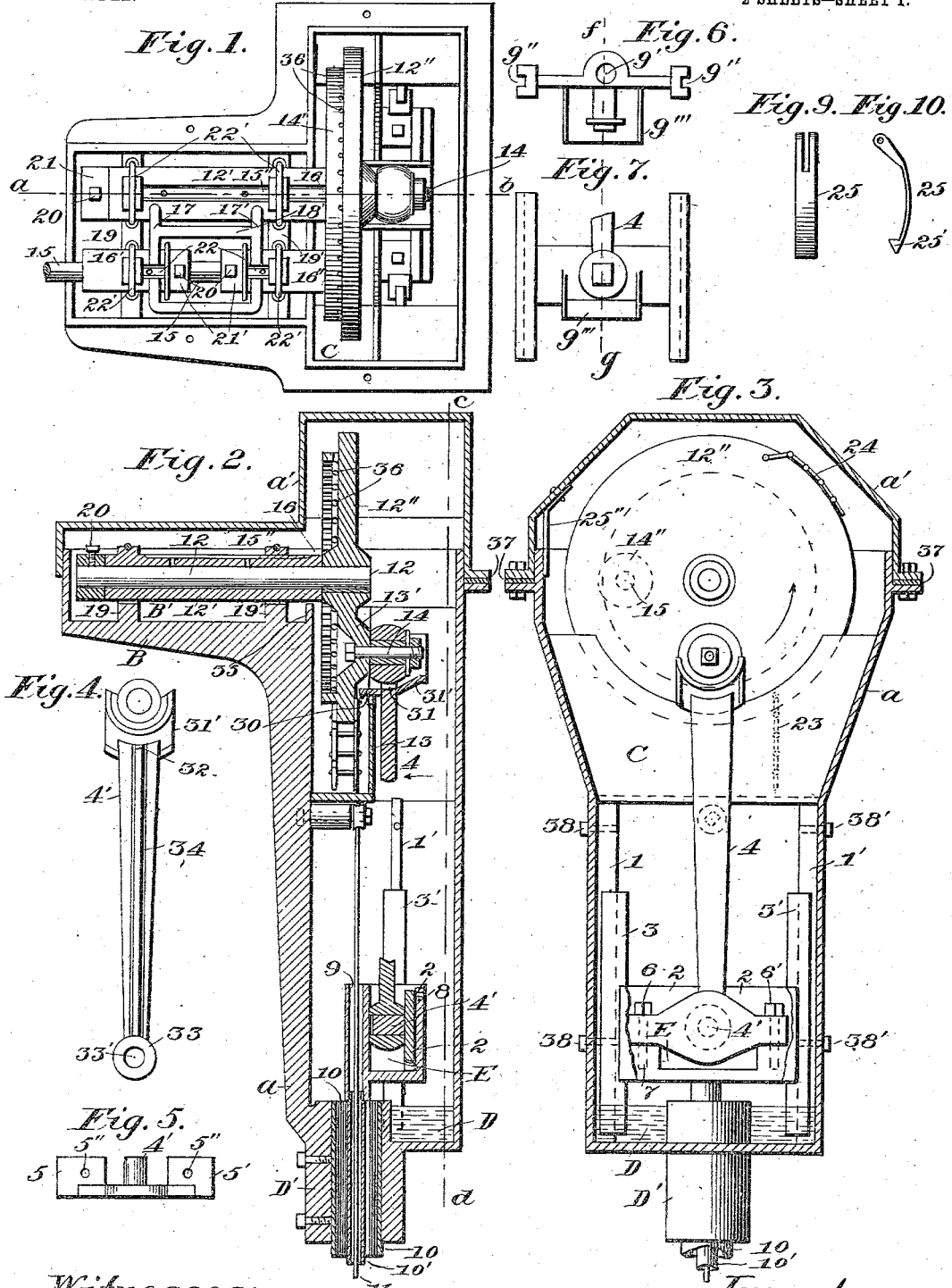

UNITED STATES PATENT OFFICE.

WILLIAM P. BRETT, OF DECATUR, ILLINOIS.

WINDMILL.

SPECIFICATION forming part of Letters Patent No. 758,296, dated April 26, 1904.

Application filed May 23, 1902. Serial No. 108,716. (No model.)

*To all whom it may concern:*

Be it known that I, WILLIAM P. BRETT, a citizen of the United States, residing at Decatur, in the county of Macon and State of Illinois, have invented a new and useful Windmill, of which the following is a specification.

My invention relates to that class known as the "upright" or "vertical" wheel windmill; and the objects of my improvement are, first, to provide means for the automatic lubrication of all of the bearings of the power-transmitting mechanism of the windmill-head; second, to provide means for protecting the bearings and the oil-reservoirs from which they are lubricated from snow, rain, and dust, and, third, to provide means by which the surplus oil that drips from the bearings is returned to the reservoirs for repeated use. I attain these objects by the mechanism illustrated in the accompanying drawings, in which—

Figure 1 is a top view of the windmill-head with the top section A of the incasement removed; Fig. 2, a vertical section of the windmill-head on the line $a\ b$, Fig. 1; Fig. 3, a vertical section on line $c\ d$, Fig. 2; Fig. 4, a view of the pitman as seen when looking in the direction indicated by the arrow in Fig. 2 and as the upper part of it appears in Figs. 11 and 13; Fig. 5, a top view of the reciprocating wrist-pin and parts made integral with it as a means for its anchorage in the cross-head oil-receptacle; Fig. 6, a top view of a modified form of cross-head in which the wrist-pin is made integral therewith; Fig. 7, a side view of the cross-head shown in Fig. 6; Fig. 8, a vertical section through Figs. 6 and 7 on the line $f\ g$ and through the lower part of a modified form of an incasement adapted to this form of cross-head; Fig. 9, a top view of an oil-elevating device as seen when looked at from above when it is on top of the crank-disk; Fig. 10, a side view of Fig. 9; Fig. 11, a vertical section through a modified form of incasement on a line corresponding to line $c\ d$ in Fig. 2; Fig. 12, a vertical section through the upper part of the incasement on line $c\ d$ of Fig. 2, and Fig. 13 is a vertical section through another modified form of an incasement on the same line that Fig. 11 is shown.

Similar letters and figures refer to similar parts throughout the several views.

First referring to Figs. 1, 2, and 3, the main frame of the windmill-head is seen to comprise an incasement made in two sections, of which A is the main or body part and A' the cover portion of the incasement. The main part A comprises at its upper portion the lateral extension or shaft-carrying bracket B and at its lower extremity the vertically-apertured anchorage portion D', upon the inside of the incasement below the bracket B the oil-reservoir C, and also within and extending from the bottom upward the cross-head guides 1 and 1'. The wheel-shaft 15 and the crank-shaft 12 have their bearings 16', 16", and 12' anchored mainly in the reservoir B' of the bracket B, and the crank-disk 12" is secured to the inner end of the shaft 12, so as to overhang the reservoir C and contact with the lubricant contained therein, and on the wheel-shaft 15 is mounted the pinion 14", so as to mesh with the internal gear 14', which is preferably an integral part of the crank-disk 12". The collar 21 on shaft 12 in connection with the crank-disk retain this shaft in axial position, and collars 21' on shaft 15 serve the double purpose of lubricating the bearings adjacent thereto and of maintaining the axial position of the wheel-shaft. The bearings 12', 16', and 16" are preferably made integral with the cross-connecting bars 17 and 17' and the longitudinal bars 18 and 18' and are removably anchored on the bridges 19 and 19' in the reservoir B'. The pitman 4 is pivoted at its upper end on the wrist-pin 14 of the crank-disk 12", and at its lower end on the wrist-pin 4' in the cross-head reservoir E, immediately below the upper pitman-bearing, and preferably made integral therewith, is the concave oil-deflecting shelf 31', sloping so as to drain toward the crank-disk, and is provided with the downwardly-projecting lip 30, which stands close to the crank-disk and causes all oil flowing from the deflector 31' to fall into the reservoir C, the inner wall 13 of which if projected upward would strike the shelf 31' close to the body part of the pitman, with the lip 30 projecting into the reservoir C with a considerable space between it and the wall 13, so that no oil will fall outside thereof when the pitman is at the upper portion of its stroke. The cross-head oil-reservoir E is provided with the overflow duct 8 above the level of the pitman-bearing therein. The oil-reservoir D is formed in the bottom portion of the incasement by the upwardly-projecting part of the anchorage portion D', which surrounds the upper end of the tubular shaft 10 on the inside of the incasement and the surrounding walls of the incasement, and the slides 3 and 3' of the cross-head 2 are adapted to project below the upper part of the anchorage portion D' and contact with the lubricant in the reservoir D when the cross-head is at its lower limit, so that the cross-head is continuously lubricated from the reservoirs D and E. By the use of the short hinged parts or chains (shown at 23 and 24 in Fig. 3) it is readily seen that oil from the extreme bottom portion of the reservoir C may be taken up and distributed to all of the bearings adjacent to the crank-disk and that it is not necessary for the reservoir to be so closely located as to cause the disk to contact with the oil therein when these auxiliary oil-elevating parts are used.

In operation the reservoirs B', C, D, and E are filled with oil, and as the crank revolves in contact with the oil in the reservoir C a liberal quantity of oil will flow from the slowly-moving disk to all parts connected therewith. The oil flowing onto the end of the bearing 12' will be mainly conducted by the incline 16 into the groove 15" on the top thereof, from which a portion of it will go to the interior of the bearing through suitable ducts and the surplus will overflow into the reservoir B' below, from which this surplus is conducted back to the reservoir C by overflowing the wall 35. Thus a constant level of oil is maintained in reservoir B', in contact with which the collars 21' will rotate and elevate a portion thereof and cause it to flow onto the ends of the bearings adjacent thereto and through suitable ducts to the interior of the bearings. The oil that flows from the crank onto the upper end of the pitman and wrist-pin 14 will as it drips or flows therefrom be deflected by the shelf 31', so as to also drain back into the reservoir C. Thus it is seen that during the operation of the windmill there is a continuous and liberal circulation of oil from the reservoir below the crank-disk up and through all of the bearings and frictional parts of the windmill-head thereabove and a return of the oil to the reservoir for repeated or continuous use, while the lower end of the pitman and cross-head are continuously lubricated from reservoirs D and E without waste of oil, as described above.

If a more liberal flow of oil is desired than will result from the use of the short flexible parts 22 and 24, (shown in Fig. 3,) the device shown in Figs. 9 and 10, which is provided with the bucket 25' or a continuous chain or link belt, may be substituted therefor, as shown in Fig. 12, in which 26' represents an idler near the bottom within the reservoir for retaining the chain in position. With the continuous-chain method of elevating oil onto the crank-disk it is readily seen that the reservoir C may occupy a position at any convenient distance below the crank or that this reservoir may be dispensed with altogether, as shown in Figs. 8, 11, and 13, in which the oil is represented as being elevated from the reservoir in the bottom part of the incasement to the crank-disk, from which it is distributed to all of the bearings, as above described. When the reservoir C is dispensed with and the endless chain 27 used to elevate the oil, the bottom portion of the incasement is modified, as shown in Figs. 8 and 11, so that there is room for the idler 27' between the anchorage portion of the incasement and the outer wall of the reservoir below the crank-disk. In connection with the forms shown in Figs. 8, 11, and 13 the pitman and cross-head are modified to conform to the requirements of these changed conditions, the cross-head requiring no oil-reservoir in connection therewith to lubricate the wrist-pin; but instead thereof the oil-duct 32 is made through the deflector 31', which leads into the channel 34, which is adapted to conduct the surplus oil that flows from the upper pitman-bearing to the cross-head wrist-pin below, and immediately below this wrist-pin is the oil-deflector 9''', which in connection with the cross-head prevents the oil from dripping into the vertical aperture of the pivot portion D' and conducts it into the reservoir adjacent thereto for continuous use.

In connection with the modified form of incasement, pitman, and cross-head (shown in Fig. 11) it may be desirable in some special cases to use a pump instead of the endless-chain to elevate the oil, which can be done as shown in Fig. 13, in which 28 is a pump-cylinder, 28' a pump-plunger carried by the cross-head 2'', which is adapted to raise clear of the cylinder on the upstroke and to enter it on the downstroke, forcing the oil that enters at the top from the reservoir D'' out through the pipe 29, so as to discharge from the nozzle 29' onto the crank-disk, from which it is distributed to the frictional parts of the windmill-head, as above described.

To make the incasement air-tight, so as to protect the reservoirs and working parts of the head from rain, snow, and dust during storms, a gasket, as 37, is placed between the sections of the incasement.

What I claim as new, and desire to secure by Letters Patent, is—

1. In a windmill, in combination an incasement constituting the main frame of the windmill-head, a lateral extension at the upper part of and forming a part of said incasement, a rotatable shaft mounted in said extension with a part projecting into the main or body part of the incasement, a crank portion made rigid with said projecting part, a reciprocating part below said crank portion, a pitman operatively mounted and adapted to actuate said reciprocating part upon the rotation of said shaft, a vertically-apertured pivot portion and an oil-reservoir arranged at the lower part of said incasement, and means whereby the bearings of said shaft, crank portion, pitman, and reciprocating part are automatically lubricated during the operation of the windmill.

2. In windmills, in combination an incasement constituting the main frame of a windmill-head, a lateral extension, a rotatable shaft mounted in said extension with a part projecting into the inclosure of the main or body part of said incasement, a crank portion secured to the inward-projecting part of said shaft, a reciprocating part below said crank portion and within the incasement, a pitman operatively connected to said crank portion and reciprocating part, an oil-reservoir within said incasement below said crank portion, a vertically-apertured pivotal anchorage portion at the lower part of the incasement, means whereby the bearing of said shaft and both bearings of the pitman are automatically lubricated from said reservoir during the operation of the windmill, and means whereby the surplus oil dripping from said pitman-bearings is deflected into said reservoir.

3. In windmills, in combination an incasement constituting the main frame of the windmill-head, a rotatable shaft mounted within the upper portion of the incasement and carrying a crank portion, a reciprocating part operatively mounted within the lower part of the incasement, a pitman pivoted, to a pin eccentric to said shaft, at its upper end and to said reciprocating part at its lower end, an oil-reservoir located within the lower portion of said incasement, means whereby the bearings of said shaft, pitman, and reciprocating part are automatically lubricated, during the operation of the windmill, with oil taken from said reservoir, and means whereby the surplus oil dripping from said bearings is caused to return to the reservoir.

4. In a windmill, in combination a rotatable member and a reciprocating part, mounted one above the other, a pitman operatively connected to said member and adapted to actuate said part, an oil-reservoir arranged below the operative range of the pitman connection with the said member, means whereby oil from the said reservoir is caused to lubricate the said pitman connection upon the rotation of the said member, and an oil-deflector mounted to move with the said pitman and adapted to conduct the oil that drips from the said connection back into the said reservoir.

5. In combination a rotatable member and a reciprocating part, mounted one above the other, a pitman operatively connected to said member and adapted to actuate said part, an oil-reservoir arranged below the operative range of the pitman connection with said member, means whereby lubricant taken from said reservoir is applied to the said pitman connection, and a deflecting part made integral with the said pitman and adapted to conduct the oil that drips from said pitman connection back into the said reservoir.

6. In a windmill, in combination a rotatable member and a reciprocating part, mounted with said member above said part, a pitman operatively pivoted to said member and part and adapted to reciprocate said part upon the rotation of said member, an oil-receptacle mounted below the operative range of said pitman connections, means for automatically lubricating said pitman connections with oil taken from said receptacle, and oil-deflectors mounted below said connections whereby the oil dripping therefrom is conducted into said receptacle.

7. In a windmill, in combination an incasement constituting the main frame of the windmill-head, a rotatable member and a reciprocating part, mounted within said incasement with said member above said part, a pitman operatively connected near one end to said member and near the other end to said part, an oil-receptacle within the incasement below the operative range of the pitman connection to said member, an oil-elevating device actuated by said member and adapted to elevate oil from said receptacle to a position from which a portion of it will flow to the pitman connection adjacent to said member, and an oil-deflector mounted to move with said connection and adapted to conduct the surplus oil that drips therefrom into said receptacle.

8. In a windmill, in combination an incasement constituting the main frame of the windmill-head, a vertically-apertured anchorage portion rotatable with said head, a rotatable member operatively mounted at the upper part of the incasement and a reciprocating part operatively mounted part within said incasement and part extending through the vertical aperture of said pivot portion, a pitman operatively connected at one end to said member and at the other end to said reciprocating part, an oil-reservoir at the lower portion of said incasement, an oil-elevating device actuated by said member whereby oil is raised from said reservoir and caused to flow onto said member, pitman and the bearings thereof, and an oil-deflector below the pitman connections, whereby the surplus oil flowing therefrom is caused to drain into said reservoir.

9. In a windmill, in combination an incasement constituting the main frame of the windmill-head, a rotatable member mounted within the upper part and a reciprocating part mounted within the lower part of said incasement, a pitman operatively connected to said member at one end and to said part at the other end, an oil-reservoir made integral with and inclosed by the lower portion of said incasement, a flexible oil-elevating device actuated by said member and adapted to raise oil from said reservoir and cause it to flow onto said member and pitman and the bearings thereof, and oil-deflecting devices arranged below said pitman connections whereby the surplus oil therefrom is conducted into said reservoir.

10. In a windmill, in combination a windmill-head, bearings mounted in said head, an incasement arranged to inclose said bearings, a rotatable member and a reciprocating part mounted, one above the other and mainly within the said incasement, a pitman operatively connected to and adapted to impart motion from said member to said part, an oil-reservoir inclosed at the lower portion of said windmill-head, means for conveying oil from said reservoir to all of said bearings during the operation of the windmill, and means whereby the surplus oil dripping from said bearings is caused to return to said reservoir.

11. In a windmill, in combination a windmill-head, bearings mounted in said head, an incasement arranged to inclose said bearings, power-transmitting mechanism mounted mainly within said incasement, a vertically-apertured anchorage portion adapted to rotate with the head, means in operative connection with said power-transmitting mechanism extending through the vertical aperture of said anchorage portion and adapted to actuate other mechanism therebelow, an oil-reservoir adjacent to said anchorage portion, means for applying oil from said reservoir to said bearings, and means for causing the surplus oil dripping from said bearings to return to said reservoir.

12. In a windmill, in combination a main frame or turn-table, substantially parallel bearings made integral with one another and removably secured to said frame, shafts mounted in said bearings, gears carried by said shafts and adapted to mesh together, a vertically-apertured anchorage portion constituting the pivot part of said main frame, and power-transmitting mechanism in operative connection with one of said gears and adapted to extend through the vertical aperture of said anchorage portion and actuate other mechanism therebelow.

13. In a windmill, in combination substantially parallel shaft-bearings made integral with cross and longitudinal alinement-bars and detachably secured to the main frame of the windmill-head, rotatable shafts journaled in said bearings, spur-gears mounted upon said shafts and meshing together, a crank portion mounted to rotate with one of said gears, and collars abutting against the ends of said bearings in such manner as to maintain the axial position of said shafts.

14. In a windmill, in combination spaced bearings for the wheel-shaft, a crank-shaft bearing substantially parallel to said spaced bearings, cross and longitudinal alinement-bars made integral with said bearings, a crank-shaft journaled in said crank-shaft bearing, a wheel-shaft journaled in said spaced bearings, gears upon said shafts operatively meshing together, a collar upon said crank-shaft coacting with the crank portion and bearing to maintain the axial position of the shaft, and collars upon the wheel-shaft abutting against the adjacent ends of said spaced bearings to maintain the axial position of the wheel-shaft.

15. In a windmill, in combination spaced bearings for the wheel-shaft, a crank-shaft bearing substantially parallel to and made integral with said spaced bearings, a crank-shaft, carrying a crank portion, and journaled and axially fixed in said crank-shaft bearing, a wheel-shaft journaled in said spaced bearings, collars abutting against the adjacent ends of said spaced bearings, gears meshing together and mounted to rotate with said shafts, and an incasement comprising a suitable anchorage and protecting-inclosure for said bearings, gears and crank portion.

16. In a windmill, in combination substantially parallel crank and wheel shaft bearings made integral and adapted to be removably attached to their anchorage, wheel and crank shafts rotatably mounted and axially fixed in said bearings, gears meshing together, and a crank portion carried by said shafts, and an incasement comprising a suitable anchorage and protecting-inclosure for said bearings, gears and crank portion.

17. In a windmill, in combination an incasement constituting the main frame of the windmill-head, a vertically-apertured pivotal anchorage portion at the lower part of said incasement, shaft-bearings removably mounted in said incasement, shafts carried by said bearings, gears secured to said shafts and adapted to mesh together, an oil-reservoir mounted in close proximity to said anchorage portion, power-transmitting mechanism in operative connection with one of said gears and adapted to extend through said anchorage portion and impart motion to other mechanism therebelow, means whereby the bearings of said shafts and the power-transmitting mechanism above said anchorage portion is caused to be automatically lubricated, and means whereby the surplus oil flowing from the bearings and mechanism above said reservoir is caused to drain therein.

18. In a windmill, in combination a rotatable member and a reciprocating part mounted, one above the other, a pitman operatively connected to said member and part and adapted to impart motion from one to the other, an oil-reservoir arranged below the operative range of the said pitman connections, means whereby oil is transferred from said reservoir to said pitman connections, and oil-deflectors mounted to move with said pitman and adapted to conduct the oil that drips from said connections into said reservoir.

19. In a windmill, in combination a main frame or turn-table, a vertically-apertured pivot portion, power-transmitting mechanism having a portion thereof adapted to extend operatively through the vertical aperture of the said pivot portion, gears operatively mounted and adapted to actuate the said power-transmitting mechanism, an oil-storage reservoir, means whereby the frictional parts of the said gears and of the part of the said mechanism that is above the said pivot portion are adapted to be automatically lubricated with oil from the said reservoir during their operation, and means whereby the surplus lubricant dripping from the said frictional parts is caused to return into the said reservoir.

20. In a windmill, in combination a main frame or turn-table, a vertically-apertured pivot portion, a power-transmitting member carried by said main frame and adapted to extend operatively through and actuate other mechanism below the said pivot portion, gears operatively mounted and adapted to actuate said power-transmitting member, an oil-reservoir carried by said main frame, means whereby said gears and the frictional parts of said member above the said pivot portion are automatically lubricated upon the rotation of the said gears, with lubricant from said reservoir, and an incasement portion adapted to inclose the said gears, reservoir and the part of the said member above the said pivot portion.

21. In a windmill, in combination an incasement constituting the main frame or turn-table and adapted to inclose all of the principal bearings and frictional parts of the power-transmitting mechanism of the windmill-head, a vertically-apertured pivot portion comprising a part of the lowermost section of the said incasement, an oil-reservoir opening upwardly in the lower portion of said incasement, means within the said incasement for automatically lubricating all of the said frictional parts during the operation of the windmill with lubricant taken from the said reservoir, and means for preventing the dripping of the lubricant into or through the said vertical aperture.

22. In a windmill, in combination an incasement comprising the main frame or turn-table of the windmill-head, a vertically-apertured portion comprising the anchorage and pivot part of the said turn-table, a motor-shaft, a vertically-arranged power-transmitting shaft extending operatively through the aperture of the said pivotal part and adapted by means of a suitable mechanism to be actuated by the said motor-shaft, an oil-reservoir carried by the said turn-table, and means whereby the main frictional parts operating in connection with the said shafts above the said anchorage portion are automatically lubricated with oil from said reservoir upon the rotation of the said motor-shaft.

23. In a windmill, in combination a main frame or turn-table, a motor-shaft, a vertically-apertured part comprising the anchorage and pivot portion of the said turn-table, an oil-storage reservoir, a power-transmitting device having a part thereof extending operatively through the vertical aperture of the said pivot portion, gears operatively mounted and adapted to transmit motion from the said motor-shaft to said device, means whereby the main frictional parts of the said motor-shaft, device and gears are automatically lubricated with oil from the said reservoir during their operation, and means whereby the surplus lubricant flowing from the said frictional parts is caused to return into the said reservoir.

24. In a windmill, in combination a main frame or turn-table, a motor-shaft, a vertically-apertured part comprising the anchorage portion of the said turn-table, an oil-storage reservoir, a power-transmitting device having a part thereof extending operatively through the vertical aperture of the said anchorage portion, gears operatively mounted and adapted to transmit motion from said shaft to said device, means whereby the main frictional parts of the said shaft, gears and device are automatically lubricated with oil from the said reservoir during their operation, means for returning the surplus lubricant, that drips from the said frictional parts, into the said reservoir, and an incasement portion adapted to coöperate with the said main frame to inclose the said frictional parts and reservoir.

25. In a windmill, in combination spaced bearings, rigid side bars made integral with and connecting said bearings, another bearing substantially parallel to the said spaced bearings, and rigid cross-bars made integral with and connecting the spaced bearings with the said other bearings.

26. In combination a main frame, a wheel-shaft, a crank-shaft, spaced bearings for the said wheel-shaft, another bearing substantially parallel to the said spaced bearings and adapted to carry the said crank-shaft, rigid connecting portions made integral with the said wheel and crank shaft bearings, and means whereby the said bearings are rigidly secured to the said main frame.

WILLIAM P. BRETT.

Witnesses:
S. R. GHEE,
JAMES S. BALDWIN.